US008748680B2

(12) United States Patent
Hogendoorn et al.

(10) Patent No.: US 8,748,680 B2
(45) Date of Patent: Jun. 10, 2014

(54) PROCESS FOR CATALYTIC HYDROTREATMENT OF A PYROLYSIS OIL

(75) Inventors: Johannes Antonius Hogendoorn, Enschede (NL); Sascha Reinier Aldegonda Kersten, Enschede (NL); Lavanya Meesala, Amsterdam (NL); Ferran De Miguel Mercader, Enschede (NL); Argi Joachim Antonio Moppi, Amsterdam (NL); Colin John Schaverien, Amsterdam (NL)

(73) Assignee: Shell Oil Company, Houston, TX (US)

( * ) Notice: Subject to any disclaimer, the term of this patent is extended or adjusted under 35 U.S.C. 154(b) by 869 days.

(21) Appl. No.: 12/953,182

(22) Filed: Nov. 23, 2010

(65) Prior Publication Data

US 2011/0119994 A1    May 26, 2011

(30) Foreign Application Priority Data

Nov. 24, 2009 (EP) .................................. 09176898

(51) Int. Cl.
*C07C 1/00* (2006.01)

(52) U.S. Cl.
USPC ........ 585/240; 585/242; 208/113; 208/120.3; 208/120.35; 208/144

(58) Field of Classification Search
CPC .............. C10C 5/00; C10G 3/42; C10G 3/46; C10G 45/50; C10G 2300/1011; C10G 2300/1048; C10G 2300/202; C10G 2400/02; C10G 2400/04; C10B 53/02; Y02E 50/10; Y02E 50/14
USPC .......... 585/240, 242; 208/113, 120.3, 120.35, 208/144; 44/605
See application file for complete search history.

(56) References Cited

U.S. PATENT DOCUMENTS

| 5,180,868 A * | 1/1993 | Baker et al. ................... 585/240 |
| 5,705,722 A * | 1/1998 | Monnier et al. ............. 585/240 |
| 8,067,657 B2 * | 11/2011 | Duarte Santiago et al. ... 585/733 |
| 8,158,842 B2 * | 4/2012 | McCall .......................... 585/802 |
| 8,324,438 B2 * | 12/2012 | Brandvold et al. ........... 585/240 |
| 2008/0053870 A1 * | 3/2008 | Marker et al. .................. 208/67 |

FOREIGN PATENT DOCUMENTS

| WO | WO 2006/100584 | * 9/2006 |
| WO | WO 2007/125332 | * 11/2007 |
| WO | 2008151269 | 12/2008 |
| WO | 2009126508 | 10/2009 |

OTHER PUBLICATIONS

Ardiyanti, A.A. et al., Abstract—"Process-Product Studies on Pyrolysis Oil Upgrading by Hydrotreatment with Tu/C Catalysts", AICHE 2009, Spring Meetings, pp. 1-6.
Ardiyanti, A.A. et al.,Excerpt—"Process-Product Studies on Pyrolysis Oil Upgrading by Hydrotreatment with Tu/C Catalysts", AICHE 2009, Spring Meetings.
Biocoup, Publishable Executive Summary.
Bui, V.N. et al., "Co-Processing of Pyrolisis Bio Oils and Gas Oil for New Generation of Bio-Fuels: Hydrodeoxygenation of Guaiacol and SRGO Mixed Feed", Catalysis Today, vol. 143, (2009), pp. 172-178.
de Miguel Mercader, F., "Pyrolysis Oil Upgrading for Co-Processing in Standard Refinery Units", Ph.D. Thesis, University of Twente, The Netherlands (2010).
Domine, M.E., et al. "Towards Second Generation Bio-Fuels by Biomass/Fossil Sources Co-Processing in FCC Units", CNRS/ Universite Claude Bernard Lyon1, France.
Domine, M.E., et al., "Co-Processing of Oxygenated Biomass Compounds and Hydrocarbons for Sustainable Fuel Production".
Elliott, D.C. et al., "Liquid Fuels by Low-Severity Hydrotreating of Biocrude", Developments in Thermochemical Biomass Conversion, vol. 1, pp. 611-621, 1996.
Elliott, D.C., "Historical Developments in Hydroprocessing Bio-Oils", Energy & //fuels, (2007), vol. 21, pp. 1792-1815.
Fogassy, G., "Biomass Derived Feedstock Co-Processing with VGO for Hybrid Fuel Produciton in FCC Units", Institut de Recherches sur la Catalyse et l'Environnement de Lyon, France.
Fogassy, G.,"Biomass Derived Feedstock Co-Processing with Vacuum Gas Oil for Second-Generation Fuel Production in FCC Units", (2010), Applied Catalysis B: Environmental, vol. 96, pp. 476-485.
Gutierrez, A. et al., Biocoup, "Co-Processing of Upgraded Bio-Liquids in Standard Refinery Units—Fundamentals", 15th European Biomass Conference, May 2007.
Gutierrez, A. et al., "Hydrodeoxygenation of Guaiacol as Model Compound for Pyrolysis Oil on Noble Metal Catalysts", Extended Abstract, 14th ICC, Seoul, Korea, 2008.
Gutierrez, A. et al., "Hydrodeoxygenation of Guaiacol", Helsinki University of Technology, Laboratory of Industrial Chemistry, Europacat VIII-Turku, Aug. 2007.
Gutierrez, A. et al., "CoMo and NiMo Catalysts in the Hydrodeoxygenation of Guaiacol", Helsinki University of Technology, Laboratory of Industrial Chemistry, Athens, Jun. 2007.
Hogendoorn, K., Biocoup, "Upgrading of Pyrolysis Oil for Application in Standard Refineries", Tcbiomass, Sep. 2009, TCCB, University of Twente, Netherlands.
Leijenhorst, E., "Hydrotreating of Pyrolysis-Oil"—Theoretical and Experimental Evaluation of a Continuously Stirred Tank Reactor in the Hydrotreating Process, Thermo Chemical Conversion of Biomass, Univrsity of Twente, (2006.
Marsman, J.H. et al., "Identification and Classification of Components in Flash Pyrolysis Oil and Hydrodeoxygenated Oils by Two-Dimensional Gas Chromatography and Time-of-Flight Mass Spectrometry", Journal of Chromatography A, 1188, (2008), pp. 17-25.
Mercader, F. et al., Biocoup, "Upgrading of Bio-Liquids for Co-Processing in Standard Refinery Units".

(Continued)

*Primary Examiner* — Nina Bhat

(57) ABSTRACT

A process for catalytic hydrotreatment of a pyrolysis oil derived from lignocelluloses is provided.

22 Claims, No Drawings

(56) References Cited

OTHER PUBLICATIONS

Proceedings—Oral Presentations, The 2nd Nordic Wood Refinery Conference (NWBC-2009) Finland, Sep. 2009.
Parkash, S., Refining Processes Handbook, 2003, Elsevier.
Parkash, S., Excerpt: Refining Processes Handbook, Chapter 2, "Distillate Hydrotreating", pp. 29-61, 2003.
Schaverien, Dr. C., "Intergrated Production of Energy and Other Products Through the Concept of Biorefinery", BioRefintec, Apr. 2007, Amsterdam, Shell Global Solutions Internationale, B.V.
Solantausta, Yrjo, "Co-Processing of Upgraded Bio-Liquids in Standard Refinery Units—Biocoup", European Conference on Biorefinery Research, Helsinki, Oct. 2006.
Solantausta, Yrjo, Biocoup—"Co-Processing of Bio-Oils in Standard Refinery Units", Bioenergy Contractors Meeting, Session 8, Brussels, Oct. 2008.
Stirling, D., "The Sulfur Problem: Cleaning Up Industrial Feedstocks", Royal Society of Chemistry, Chemistry Dept., University of Glasgow, UK.
Stirling, D., Chapter 2, Catalytic Hydrodesulfurisation, Royal Society of Chemistry.
Wildschut, J., "Pyrolysis Oil Upgrading to Transportation Fuels by Catalytic", 1981.

* cited by examiner

PROCESS FOR CATALYTIC HYDROTREATMENT OF A PYROLYSIS OIL

This application claims the benefit of European Application No. 09176898.6 filed Nov. 24, 2009 which is incorporated herein by reference.

TECHNICAL FIELD OF THE INVENTION

The present invention relates to a process for catalytic hydrotreatment of a pyrolysis oil and the use of such a process in a process of producing hydrocarbon products from biomass.

BACKGROUND OF THE INVENTION

With the diminishing supply of crude oil, the use of renewable energy sources is becoming increasingly important as a feedstock for production of hydrocarbon compounds. Plants and animal biomass are being used to produce liquid and gaseous hydrocarbon compounds. One of the advantages of using biomass is that the $CO_2$ balance is more favourable as compared with the conventional hydrocarbon feedstock.

One of the existing processes for the conversion of biomass includes the steps of pyrolysing the lignocellulosic material derived from plants to obtain a pyrolysis oil, and upgrading the pyrolysis oil to obtain chemicals and fuel products.

The pyrolysis oil obtained from the pyrolysis of a feed containing lignocellulose is or contains a mixture of oxygenated compounds, formed during the decomposition of lignin and cellulose (possibly including hemicellulose) in the biomass, and water generated during the process and from the initial moisture content of the biomass. The oxygen and water content in the pyrolysis oil is believed to cause a significant reduction in the heating value of the pyrolysis oil, for example compared to conventional oil. Further, the complex chemical nature and high viscosity adds to the difficulty of processing this pyrolysis oil in standard refinery units. Hence, several processes for upgrading the pyrolysis oil have been proposed in the literature. Examples of these processes include Hydrodeoxygenation (HDO) under high hydrogen pressures, Catalytic Cracking and High Pressure Thermal Treatment (HPTT). These upgrading processes for the pyrolysis oil may involve, for instance, removal of the oxygen (usually >95%), decarboxylation, viscosity reduction, sulfur removal, nitrogen removal, and the like.

Usually the existing Hydro-deoxygenation (HDO) processes require high pressures of hydrogen, for instance, in the range of 250 bar to 350 bar(a), for the removal of oxygen from the pyrolysis oil in the form of water. Some of these processes also suggest a multi-step hydrodeoxygenation to achieve significant (~95%) oxygen removal. These processes entail very high hydrogen consumption, which makes them uneconomical and difficult.

The most common process for conversion of biomass to hydrocarbon products is by catalytic cracking.

US-A-2008/00538705 describes a method of conversion of pyrolysis oils to useful hydrocarbon products by the process of hydrotreatment followed by hydrocracking in the presence of a catalyst. However, the catalytic cracking process results in production of coke and its subsequent deposition on the catalyst. Further the catalytic cracking process also has limitations such as reactor problems and additional expenses.

US-A-2009/0253948 describes a method of conversion of pyrolysis oils to useful hydrocarbon products by the process of partial hydrotreatment followed by full hydrotreating in the presence of a hydrocracking catalyst. However, the catalysts proposed in this process may decay under the reaction conditions, specifically under the conditions if in the hydrodeoxygenation step a large amount of water is present. This may lead in the best situation to catalyst inactivation through leaching of active components, but may also lead to weakening of the catalyst particles and/or clogging of the catalyst pores that can lead to pressure build-up in the reactor.

In his master thesis titled "Hydrotreating of pyrolysis oil" dated 7 Aug. 2006, Evert Leijenhorst describes the feasibility to partly deoxygenate pyrolysis oil. He mentions that low severity hydrotreating involves partial hydrodeoxygenation, minimal hydrocracking and effective hydrogenation. He further indicates that low severity hydrotreating is an attempt to upgrade the pyrolysis oil to produce turbine fuels for electricity generation or as a first step towards co-feeding in a conventional petroleum refinery (see section 2.4). The maser thesis mentions that the pyrolysis oil may be obtained from wood (see section 1.2). The master thesis further includes several experiments including a two-stage hydrotreating of pyrolysis oil (sections 5.5) leading to products comprising an oil phase having an oxygen content in the range from 19.7 wt % to 27.0 wt %.

Marsman et al. in their article titled "Identification and classification of components in flash pyrolysis oil and hydrodeoxygenated oils by two-dimensional gas chromatography and time-of-flight mass spectroscopy, J. Chromatogr. A 1188 (2008) pages 17-25, made available on the internet on 14 Feb. 2008, describe hydrodeoxygenation of pyrolysis oil produced from beech flakes at a pressure of 25 MPA and a temperature of 573K (about 300°) over a Palladium on carbon catalyst and a Ruthenium on carbon catalyst.

Ardiyanti et al. in their article titled "Process-product studies on pyrolysis oil upgrading by hydrotreatment with Ru/C catalysts, first presented at the AICHE 2009 spring meeting in April 2009, mentioned that pyrolysis oil is not suitable for the purpose of co-feeding into existing refineries, either in hydrotreating or FCC units, because the oil is not miscible with hydrocarbon feedstocks and shows a high tendency for coking, leading to blockage of feeding lines and reactors. As an alternative a mild hydrotreating process is suggested. The article describes several experiments. In experiment 4, a pyrolysis oil, obtained by fast pyrolysis of forest residue, was hydrotreated using Ru/C as a hydrotreating catalyst; a fixed hydrogen pressure of 200 bar; and a varying temperatures in the range from 175° C. to 350° C. The product oil obtained at these conditions, having an oxygen content of 17.6 wt %, was subjected to a second hydrotreating procedure, using Ru/C as a hydrotreating catalyst; a fixed hydrogen pressure of 200 bar; and a varying temperatures in the range from 350° C. to 400° C. Two phases were formed, viz. a black oil floating on top of a clear water layer. The oxygen content of the oil was reduced to respectively 12.3 wt % and 11.5 wt %.

Hence, while some processes for upgrading the pyrolysis oil to produce hydrocarbon products have been described, there is a need for an improvement in the processes for conversion of pyrolysis oils to useful hydrocarbon products.

SUMMARY OF THE INVENTION

Accordingly, in one embodiment the present invention provides a process for treating a pyrolysis oil derived from a material comprising lignocellulose in which a) a feed comprising the pyrolysis oil is subjected to a hydrodeoxygenation step in the presence of a catalyst comprising an active component on a catalyst carrier that is inert at the reaction conditions, to obtain a product stream comprising a partially deoxygenated pyrolysis oil; b) separating the partially deoxygenated pyrolysis oil from the product stream obtained in a) thereby producing a separated partially deoxygenated pyrolysis oil; the improvement comprising the further steps of c) providing to a hydrogenation step at least a portion of the separated partially deoxygenated pyrolysis oil having an oxygen content of from 10 to 30 wt %; d) hydrogenating, in the hydrogenation step, the separated partially deoxygenated pyrolysis oil from c) in the presence of a catalyst and a hydrocarbon feed derived from a mineral crude oil to obtain a hydrogenated product stream; and e) separating at least one product fraction from the hydrogenated product stream obtained in d).

In another embodiment of the present invention provides a process for producing hydrocarbon products from biomass by pyrolyzing a biomass comprising lignocellulose to obtain a pyrolysis oil, subjecting the pyrolysis oil to a hydrodeoxygenation step in the presence of a catalyst comprising an active component on a catalyst carrier that is inert at the reaction conditions, to obtain a product stream comprising a partially deoxygenated pyrolysis oil;

separating the partially deoxygenated pyrolysis oil from the product stream thereby producing a separated partially deoxygenated pyrolysis oil;

the improvement comprising the further steps of providing to a hydrogenation step at least a portion of the separated partially deoxygenated pyrolysis oil having an oxygen content of from 10 to 30 wt %;

hydrogenating, in the hydrogenation step, said provided-separated partially deoxygenated pyrolysis oil in the presence of a catalyst and a hydrocarbon feed derived from a mineral crude oil to obtain a hydrogenated product stream;

separating at least one product fraction from the hydrogenated product stream; and blending at least one product fraction obtained with at least another fuel compound and/or an additive thereby producing a biofuel.

It has now been found that carrying out the hydrogenation step in the presence of a hydrocarbon feed derived from a mineral crude oil, advantageously leads to a reduction of coke formation in the reactor.

The hydrocarbon products include aromatic and cyclic hydrocarbon compounds which can directly be used, or when treated further can be converted into fuels.

DETAILED DESCRIPTION OF THE INVENTION

It has been found that a partially deoxygenated pyrolysis oil with an oxygen content of up to 30 wt % when subjected to hydrogenation in the presence of a catalyst and a hydrocarbon feed derived from a mineral crude oil leads to the formation of hydrocarbon products such as aromatic compounds, paraffins and cyclic hydrocarbons with acceptable properties and especially negligible oxygen content and without high loss due to side reactions such as coking, at comparable rates as obtained for an unblended hydrocarbon feed.

Without wishing to be bound to any kind of theory, it is believed that cofeeding in a hydrogenation step of the partially deoxygenated pyrolysis oil and the hydrocarbon feed derived from a mineral oil also leads to a synergistic effect. The coking during the hydrogenation step is less than what would be expected on the basis of the sum of the coke make for each feed when fed to the hydrogenation separately.

The present invention preferably further involves a step of pyrolysis of a biomass, specifically a material comprising lignocellulose, to obtain a pyrolysis oil.

The process of producing hydrocarbon products from biomass according to the present invention more preferably further involves the steps of: Pyrolysis of a biomass to obtain pyrolysis oil; and hydrogenation of the pyrolysis oil to produce one or more hydrocarbon products including, for instance, paraffins.

The biomass feedstock, and specifically the material comprising lignocellulose from which the pyrolysis oil is derived, may include lignocellulosic material derived from for instance, agriculture waste, forest residue, wood chips, straw, chaff, grain, grasses, corn, corn husks, weeds, aquatic plants, hay and any cellulose containing biological material or material of biological origin, also including municipal waste. Preferably, the biomass feedstock, and specifically the material comprising lignocellulose, includes forest residue.

If present, the pyrolysis step in the process of the invention preferably includes a process wherein the biomass feedstock (interchangeably referred to as biomass herein) comprising lignocellulose is decomposed, preferably in the absence of oxygen, into gaseous, liquid and solid decomposition products at high temperatures. The temperature in this step preferably lies in the range of about 300° C. to 800° C., more preferably about 400° C. to 800° C., still more preferably in the range of about 400° C. to 700° C., still more preferably in the range of about 500° C. to 700° C. or in the range of about 450° C. to 650° C., and yet more preferably, the pyrolysis temperature in the range of from 550° C. to about 650° C.

More preferably, the pyrolysis process includes a flash pyrolysis process, wherein the biomass is rapidly heated to a temperature in the range of 400° C. to 600° C. in the absence of oxygen to produce pyrolysis oil, with yields in the range of 60 wt % to 80 wt %. A similar process is for instance described in U.S. Pat. No. 5,395,455. This process usually yields a product blend comprising water in amounts of up to 40 wt %.

The pyrolysis oil, as referred to in the present invention preferably includes a mixture of oxygenated compounds formed during thermal decomposition of lignin and cellulose, and water generated during the decomposition process and from the initial moisture content of the biomass. In a further embodiment the reference to cellulose may further include hemicellulose. Preferably, the carbon content of the pyrolysis oil lies in the ranges of 45% to 50%. Preferably, the water content is in the range of 0 wt % to 30 wt %, more preferably in the range of 20 wt % to 30 wt %. Further preferably, the pyrolysis oil of the present invention comprises aldehydes in the range of 10 wt % to 20 wt %. Further preferably, the pyrolysis oil comprises carboxylic acids in the range of 10 wt % to 15 wt %. Yet further preferably, the pyrolysis oil comprises carbohydrates in the range of 5 wt % to 30 wt %, more preferably in the range of 5 wt % to 10 wt %. Again further preferably, the pyrolysis oil comprises phenols in the range of 2 wt % to 5 wt %. Again more preferably, the pyrolysis oil comprises furfurals in the range of 1 wt % to 4 wt %, and/or alcohols and ketones. The pyrolysis oil may also contain nitrogen in the range of 0.1 wt % to 0.5 wt %, and sulfur in the range of 0.01 wt % to 0.02% wt %. The presence of water and nitrogen and sulfur containing compounds may make pyrolysis oil not suitable for processing in standard refinery units.

In step a) of the process according to the invention, the pyrolysis oil is subjected to a hydrodeoxygenation step to obtain a product stream comprising a partially deoxygenated pyrolysis oil. This reaction step is further referred to as hydrodeoxygenation (HDO) reaction. Step a) of the present invention is preferably carried out by contacting the pyrolysis oil with hydrogen in the presence of a suitable hydrogenation catalyst, at suitable conditions. The reaction may suitably be carried out at elevated pressure and temperature in a suitable reactor, such as for instance in a stirred autoclave, or a trickle flow reactor with a stacked catalyst bed. The hydrodeoxygenation is preferably carried out at a pressure ranging from 100 bars to 350 bars. More preferably the total pressure is in the range of from 250 to 350 bar(a) (25 to 35 MPa)s, still more preferably from 280 to 320 bar(a). Most preferably, the pressure in the autoclave reactor is in the range of from 290 to 310 bar(a). The pressure is preferably regulated by a suitable reducing valve or other suitable means for regulating the hydrogen pressure. It will be understood by those skilled in the art that for the hydrodeoxygenation step at a temperature in the range from 300 and 350° C. (for example at 300 and 350° C.) the water partial pressure is in the range from 86 and 165 bar (for example 86 and 165 bar respectively) due to the high amount of water present in the feed and thus the formed steam, giving initial hydrogen partial pressures in the range from about 200 to about 125 bar (for example ca. 200 and 125 bar, respectively) thus appreciably lower than the total reaction pressure. Yet further, the partial pressure of hydrogen preferably is higher than in other HDO processes in absence of large amounts of water, since the solubility of hydrogen in a polar solvent such as water is lower than in e.g. non-aqueous hydrocarbon feeds. As an example, when performing the HDO reaction at 300° C., due to forming light gases such as $CO_2$, $CH_4$ the $H_2$ partial pressure decreased to 42 bar.

Accordingly, the conditions in step (a) are still considered as mild, although the absolute pressure, hydrogen partial pressure and temperature may seem higher than comparable hydrogenations of hydrocarbon streams.

In step (a), preferably the feedstock, comprising pyrolysis oil, optionally pre-hydrogenated, and hydrogen are contacted with a hydrogenation catalyst under hydrodeoxygenation conditions. Preferably, feedstock and hydrogen are co-currently contacted with the catalyst.

Hydrodeoxygenation conditions for pyrolysis oil containing feedstocks are known in the art. Preferably, the hydrodeoxygenation temperature in step (a) is in the range of from 200 to 400° C., preferably from 250 to 380° C., more preferably of from 280 to 340° C., yet more preferably of from 290 to 320° C. Reference herein to the hydrodeoxygenation temperature is to the maximum temperature that is occurring in hydrodeoxygenation step (a). Since the hydrodeoxygenation reaction is a strongly exothermic reaction, the temperature in the bottom part of the bed will typically be higher than the temperature in the upper part of the bed.

The catalyst suitably employed in step (a) may be any catalyst known in the art that is suitable for hydrodeoxygenation reaction under the specific conditions of this reaction such as higher water concentration. The catalyst preferably is a hydrogenation or hydrocracking catalyst comprising metals of Group VIII and/or Group VIB of the Periodic Table of Elements or compounds thereof, as hydrogenating component on a catalyst carrier. The catalyst carrier is preferably inert at the reaction conditions, that is, it is preferably inert as hydrogenating component. Inert herein preferably further refers to a catalyst carrier not dissolving or otherwise decaying under the HDO conditions to avoid e.g. metal leaching or weakening of the catalyst pellets for instance due to the amount of water present in the feed.

The catalyst preferably comprises a catalyst support and one or more active elements. The active elements may include metals such as Nickel (Ni), Chromium (Cr), Molybdenum (Mo), and Tungsten (W), Cobalt (Co), Platinum (Pt), Palladium (Pd), Rhodium (Rh), Ruthenium (Ru), Iridium (Ir), Osmium (Os), Copper (Cu), iron (Fe), Zinc (Zn), Gallium (Ga), Indium (In) and Vanadium (V) in elementary form, alloys or mixtures of one or more thereof such as, but not limited to Rh—Co—, Ni— and Ni—Cu, preferably in the form of oxides, sulfides or other metal-organic compounds. Preferably the catalyst in step (a) is a hydroprocessing catalyst comprising Ruthenium, Rhenium, Cobalt, Nickel, Copper, and/or alloys or mixtures of Ruthenium, Rhenium, Cobalt, Nickel, and/or Copper, such as for example Rh—Co— and/or Ni—Cu, on a catalyst carrier that is inert at the reaction conditions. The catalyst support (or carrier) preferably comprises solid substances with high porosity and able to withstand the temperature, pressure and the environment encountered in a hydrotreatment unit and under the specific HDO conditions, i.e. the presence of relatively large amounts of water in the feed, and preferably is shaped in the form of balls, rings or otherwise shaped extrudates, which may serve as a support for the active elements in the catalyst. The carrier preferably may comprise a refractory oxide or mixtures thereof, preferably alumina, amorphous silica-alumina, titania or silica, ceria, zirconia, or it may comprise an inert component such as carbon or silicon carbide or carbon. Carriers that were found inert under the conditions of step a) are $ZrO_2$, $CeO_2$, $CeO_2$ and/or mixtures thereof such as $CeO_2$—$ZrO_2$, silicon carbide and/or carbon. If a catalyst comprising sulphided CoMo, NiMo or NiW is used, the catalyst may be sulphided in-situ or ex-situ. In the case of in-situ sulphiding, a sulfur source, usually hydrogen sulphide or a hydrogen sulphide precursor, is preferably supplied to the catalyst during operation of the process. The carrier may further comprise a zeolitic compound. Any acidic zeolitic compound having sufficient stability at the reaction conditions to limit catalyst decay may suitably be used. Examples of zeolitic compounds include, but are not limited to, zeolite Y, zeolite beta, ZSM-5, ZSM-12, ZSM-22, ZSM-23, ZSM-48, SAPO-11, SAPO-41, and ferrierite. Examples of suitable catalysts include $Rh/SiO_2$; $RhCo/Al_2O_3$; $Rh/CoSiO_3$; $RhCo/SiO_2$; $Co/SiO_2$; $Rh/ZrO_2$; $Rh/CeO_2$; $Ni/SiO_2$; $Ni/Cr_2O_3$; $Ni/Al_2O_3$; $Ni/ZrO_2$; Ni—$Cu/Al_2O_3$; Ni—$Cu/ZrO_2$ and Ni—$Cu/CeO_2$.

Preferably the catalyst in step a) is chosen from the group consisting of $RhCo/Al_2O_3$; $Rh/ZrO_2$; $Rh/CeO_2$; $Ni/Cr_2O_3$; $Ni/Al_2O_3$; $Ni/ZrO_2$; Ni—$Cu/Al_2O_3$; Ni—$Cu/ZrO_2$; Ru/C; Ni—$Cu/CeO_2$ and/or mixtures thereof.

The product stream obtained from the HDO step usually forms two or more phases upon cooling, depending upon the process conditions. According to the present invention, if the HDO process is performed at 300° C., a three-phase product is preferably obtained. The three-phase product preferably includes a top layer that preferably contains light organic components hereinafter referred to as a top-oil, a middle layer that preferably consists mainly of water with some dissolved organics hereinafter referred to as an aqueous phase, and a bottom layer that preferably also contains organic components, hereinafter referred to as a bottom oil. The bottom oil may contain most of the solids, for instance, the HDO catalyst and coke particles, and may be present in the form of a paste. Applicants have found that in spite of the different phases, the top oil and the bottom oil can be substantially similar in, for instance, elemental composition and molecular weight distribution. The bottom oil may be suitably filtered, and mixed with the top oil to form an organic product of the HDO reaction step. Further, some gases may also be produced during the HDO reaction step. Examples of these gases include Carbon Dioxide and Methane.

According to the invention, a two-phase product is preferably obtained when the HDO step is carried out at temperatures in the range of 200 to 300° C. The two-phase product preferably contains an organic phase (bottom oil) and an aqueous phase. At HDO temperature higher than 300° C., again a two-phase product may be obtained, or optionally a three phase product. The two-phase product may contain an organic phase (Top oil) and aqueous phase. The optional three phase product may contain a first organic phase (top oil), an aqueous phase, and a second organic phase (bottom oil). Without wishing to be bound to any particular theory, it is believed that, according to the present invention, with increasing HDO temperatures, a net transfer of organic components from the aqueous phase to the oil phase, including the Top oil and the Bottom oil, may be observed. This is believed to contribute to an increase in the carbon recovery from the oil product.

The product from the HDO step is optionally subjected to a separation step, preferably filtration, to separate the solids such as the catalyst particles.

The oxygen content (on dry basis) of the organic phase, hereinafter referred to as the partially deoxygenated pyrolysis oil, for varying HDO temperatures lies in the range of 5 wt % to 30 wt %. The oxygen content (on dry basis) of the organic phase preferably is at least 6 wt %, more preferably at least 7 wt %, more preferably at least 8 wt %, more preferably at least 9 wt %, yet more preferably at least 10 wt %, and most preferably at least 15 wt %. The oxygen content (on dry basis) of the organic phase preferably is at most 20 wt %, more preferably at most 18 wt %, most preferably at most 17 wt %. The oxygen content was determined by elemental analysis of the HDO product, calculating the oxygen content as weight difference after determination and subtraction of carbon and hydrogen content.

After step (a), preferably gaseous products are separated from the total liquid product obtained in step (a), which then is preferably separated into an aqueous phase comprising water-soluble compounds, and at least one organic phase comprising the partially (hydro-) deoxygenated pyrolysis oil.

In step (d), at least a portion of the partially deoxygenated pyrolysis oil obtained as the result of the HDO is subjected to hydrogenation in the hydrogenation step in the presence of a catalyst and a hydrocarbon feed, preferably derived from a mineral crude oil. The partially deoxygenated pyrolysis oil provided in step (c) may be separated or the product of step (b) may be used in its entirety as long as the oxygen content is within the range. Product from step (b) may be separated to obtain the partially deoxygenated pyrolysis oil having the oxygen content within the range for step (c), as for example described above.

Suitable hydrocarbon feeds for the present invention are preferably commercial hydrocracker feeds, i.e., those portions of mineral crude oil or its refinery streams that have an initial boiling point of 340° C. or higher at atmospheric pressure and preferably an average molecular weight ranging from about 200 g/mole to 600 g/mole or higher. Such hydrocarbon feedstocks to be used as co-feed for the purpose of the invention preferably include high boiling, non-residual oils such as straight run (atmospheric) gas oils, flashed distillate, coker gas oils, or atmospheric residue ('long residue') and vacuum residue ('short residue'). The co-feeding may be attained by blending the partially deoxygenated pyrolysis oil and the hydrocarbon feed streams prior to the entry into a hydrotreatment unit, or alternately, by adding them at different stages. The hydrocarbon feed used preferably has a boiling point of at least 220° C., as measured by Gas Chromatograph Distillation (GCD) according to ASTM D-2887. Preferably, the boiling points range from 220° C. to 650° C., more preferably from 300° C. to 600° C. In a preferred embodiment, the hydrocarbon feed used as a co-feed for the purpose of the invention is a vacuum gas oil (VGO) or a Long Residue. The weight ratio of hydrocarbon feed, preferably Long Residue, to partially deoxygenated pyrolysis oil is preferably in the range from 2:1 to 10:1, more preferably in the range from 3:1 to 6:1 and may for example be 4:1 (4 parts hydrocarbon feed to 1 part partially deoxygenated pyrolysis oil), although it will be appreciated by those skilled in the art that higher ratios such as 10:1 or 20:1 will enhance the ease of processing.

The hydrogenation step (d) as referred to in the present invention is preferably a process of removal of impurities like oxygen, sulfur and nitrogen from a crude by bringing it in contact with hydrogen at elevated temperature and pressure in the presence of a catalyst. In the present invention the purpose of the hydrogenation step is preferably focused more for the removal of oxygen from the partially deoxygenated pyrolysis oil. The oxygen dissolved or present in the partially deoxygenated pyrolysis oil preferably exists in the form of phenols or peroxides and is preferably eliminated in the form of water after reaction with hydrogen.

The hydrogenation step is preferably carried out in the hydrotreatment unit which is an arrangement of heaters, heat exchangers, reactors, compressors and boilers that can be set at different temperatures and pressures. The partially deoxygenated pyrolysis oil preferably enters the hydrotreatment unit through a charge pump. It is preferably mixed with hydrogen gas which is directed from a cat reforming unit or a hydrogen plant. The partially deoxygenated pyrolysis oil and the hydrogen mixture are preferably heated in succession through heat exchange with reactor effluent in a heat exchanger unit and a fired heater. Preferably the partially deoxygenated pyrolysis oil and the hydrogen which eventually gets heated enter the hydrodeoxygenation reactor within the hydrotreatment unit. Here the hydrogenation step preferably takes place.

The temperature maintained in the reactor preferably ranges from 300° C. to 450° C., more preferably from 300° C. to 350° C. The pressure preferably ranges from 50 bar atmosphere to 100 bar atmosphere, more preferably 60 bar atmosphere to 80 bar atmosphere. The number of reactor volumes of feed that can be treated in a unit time may be indicative by i) a space velocity which is preferably in the range of 1 kg/l/h to 1.5 kg/l/h and/or ii) a rate at which the hydrogen gas flows, also referred to as gas flow rate, which is preferably kept in the range of 8 to 20 Nl/hr; or a gas to oil ratio preferably in the range of 500 to 5000 Nl/kg, more preferably 1500 to 2000 Nl/kg.

The catalysts suitable for use in the process according to the invention are well known in the art. The catalyst preferably consists of two parts, a catalyst support and active elements. The support preferably consists of solid substances with high porosity and able to withstand the temperature, pressure and the environment encountered in the hydrotreatment unit. For example, alumina in the form of balls or extrudates can be used as a support for the active elements in the catalyst. The active elements used are preferably cobalt, more preferably, nickel, molybdenum and its combinations thereof.

The product stream, comprising hydrocarbons, obtained from the hydrotreatment unit is preferably sent to a fractionation zone, where it is separated into one or more hydrocarbon fractions. Preferably, these hydrocarbon fractions include naphthenics, paraffins, and mono-, di- and tri-aromatic compounds. According to an embodiment, the product stream composition includes a naphthenic fraction ranging from 10 wt % to 40 wt %, preferably from 20 wt % to 30 wt %, as determined by Gas Chromatograph Distillation (GCD)

according to ASTM D-2887. Further, the total product stream preferably also includes the paraffin fraction ranging from 10 wt % to 20 wt %.

The products obtained from the hydrocarbon fractions are also within the scope of the invention. Further these compounds can be upgraded by processes like isomerisation, aromatisation and hydrocracking to yield liquid fuels. An example for liquid fuel fractions of the paraffinic type is kerosene with an initial boiling point of about 150° C. and an end point of about 270° to 275° C. This type of fuel is preferably mainly paraffinic but can contain naphthenics and aromatics to some degree, depending upon the source of crude oil from which it is derived. Benzene, toluene, xylenes, aromatic extract oils are also examples of upgraded products that can be formed by further processing of the hydrocarbon fractions obtained as products of the present invention. The upgraded products find application in the chemical and oil and gas industry and can be used as solvents, fuels etc. Accordingly, the subject process preferably further comprising blending a product fraction obtained in step (e) with at least another fuel compound and/or an additive.

It may be understood that processing of the aforementioned hydrocarbon fractions is well known in the art and is in no way limiting to the scope of the invention. While some of the methods have been described herein, several other processes may be used to convert the hydrocarbon fractions into commercially usable products. These processes may include isomerisation, cracking into more valuable lighter products, blending with other fuels for commercial use, and other similar uses that have been disclosed in the art.

The invention is further illustrated by the following examples.

Example 1

Pyrolysis oil obtained from forest residue (2.5 kg approximately) was loaded into the reactor followed by 5 wt. % of fresh (unused) Ru/C catalyst. The maximum operating temperature and pressure were 350° C. and 340 bar(a), respectively.

A $H_2$ supply vessel used to feed the autoclave, having a volume of 10.8 L. This vessel was typically loaded with an initial pressure of 400 bar(a). The autoclave was filled with $H_2$ until the desired starting pressure (typically 200 bar(a)) and the valve between the reactor and the supply vessel was closed. Then, the electrical heating jacket and the high intensity hollow shaft stirrer (2000 rpm) were turned on. The typical heating rate was approximately 5.5° C./min until 270° C., being slower after that (~4° C./min). More hydrogen was added to the reactor until the desired reaction pressure was reached (typically 290 bar(a)). After the reaction was deemed completed, the $H_2$ supply was stopped and the stirrer was left on for an additional 30 minutes. Then the system was left to cool down overnight. A product containing one aqueous phase (also referred to as aqueous fraction) and one or two phases of partially deoxygenated pyrolysis oil (also referred to as partially deoxygenated pyrolysis oil fractions) was obtained. The partially deoxygenated pyrolysis oil fractions which were a part of the product were filtered (5 μm steel filter) to remove the Ru/C catalyst. The oxygen content of these partially deoxygenated pyrolysis oils obtained after HDO was typically up to 30 wt %. The products obtained are summarized in the table 1 provided below:

TABLE 1

Dry product yields and oil properties after HDO at different temperatures (Residence time: 4 h, total pressure 290 bar(a)).

| | Temperature (° C.) | | | | |
|---|---|---|---|---|---|
| | 230 | 260 | 300 | 330 | 340 |
| Dry yields (wt. % of dry feed) | | | | | |
| Top oil + Bottom oil | 47 | 49 | 50 | 48 | 50 |
| Aqueous phase | 39 | 33 | 26 | 16 | 14 |
| Gas | 3 | 4 | 4 | 3 | 9 |
| Water produced | 9 | 10 | 13 | 19 | 18 |
| $H_2$ consumption | | | | | |
| NL $H_2$/kg feed oil | 232 | 237 | 290 | 297 | 326 |
| NL $H_2$/kg C in product | 1031 | 1059 | 1098 | 1089 | 1153 |
| NL $H_2$/MJ of product | 21.6 | 22 | 22.3 | 21.8 | 23.6 |
| Product properties | | | | | |
| Oil phase | Bottom oil | Bottom oil | Top oil | Top oil | Top oil |
| C dry (wt. %) | 63.0 | 66.3 | 67.7 | 74.2 | 73.3 |
| H dry (wt. %) | 9.0 | 9.3 | 9.7 | 10.3 | 9.8 |
| O dry[b] (wt. %) | 28.0 | 24.4 | 22.6 | 15.5 | 16.9 |
| $H_2O$ (wt. %) | 15.9 | 10.0 | 5.7 | 3.2 | 2.1 |
| Total O[c] (wt. %) | 37.7 | 30.8 | 26.3 | 17.8 | 18.4 |
| $HHV_{wet}$[d] (MJ/kg) | 25.2 | 28.7 | 31.3 | 35.8 | 35.1 |
| MCRT (wt %) | 11.7 | 9.1 | 4.7 | 1.8 | 2.2 |
| MCRT of 20 wt % blend in Long Residue[e] (wt %) | 3.2 | 2.9 | 2.2 | 1.9 | 2.0 |
| Gas composition | | | | | |
| $CO_2$ (mol %) | 81.8 | 48.4 | 53.1 | 58.7 | 61.0 |
| CO (mol %) | 0.8 | 4.6 | 2.0 | 1.4 | 1.2 |
| $CH_4$ (mol %) | 14.1 | 24.7 | 22.5 | 21.4 | 22.1 |
| $C_2H_6$—$C_3H_8$ (mol %) | 3.3 | 21.7 | 22.2 | 18.5 | 15.7 |

[b]on dry basis, corrected for presence of water;
[c]wt % O total in HDO oil (organics + water);
[d]Higher heating value calculated using Reed's equation;
[e]MCRT (Micro Carbon Residue Test, ASTM D4530) of Long Residue only = 2.04 wt %.

Example 2

Partially deoxygenated pyrolysis oil (PDePO), prepared by hydrodeoxygenation of a pyrolysis oil at 340° C. and 290 bar as described in example 1 and having a dry oxygen content of approximately 17 wt % was blended with a hydrotreated Gas Oil (HTGO) in a weight ratio of about 1:4 (1 to 4) and some isopropanol to prepare a feed composition. This feed composition containing about 20 wt % partially deoxygenated pyrolysis oil, about 1.5 wt % isopropanol and about 78.5 wt % hydrotreated gas oil was subjected to the hydrogenation step in a continuous hydrotreatment unit. The catalyst used was a pre-sulphided Nickel-molybdenum hydrotreatment catalyst. The reaction temperature was kept at 300° C. to 320° C. (that is, at 300° C. for 100 hours of runtime and subsequently at to 320° C. for an additional 70 hours of runtime) and the pressure was maintained at 60 bar with 1% $H_2S$ in the off-gas. The gas flow rate was 20 Nl/hr. The ratio gas to oil was 2000 Nl/kg and the weight hourly space velocity maintained in the reactor was 1 kg/l/h. The product stream obtained was separated in a gas/liquid separator and analyzed online using gas chromatography (GC) and the liquid phase was analyzed by true boiling point analysis and two dimensional gas chromatography (2D-GC). The results of the experiment with regard to product yield and product distribution are represented in Tables 2 and 3 given below.

TABLE 2

Product distribution by 2D-GC in weight percent of products obtained (at 300° C. and 320° C., 60 bar)*.

| Product distribution (in wt %) | HTGO only at 300° C. | HTGO + about 20 wt % PDePO at 300° C. | HTGO + about 20 wt % PDePO at 320° C. | Extrapolation to 100 wt % PDePO at 300° C. |
|---|---|---|---|---|
| Lights (<C7) | 0.68 | 1.65 | 2.54 | 5.50 |
| Paraffins | 15.92 | 14.83 | 14.72 | 10.51 |
| Naphthenics | 24.06 | 22.96 | 22.18 | 13.55 |
| Di Naphthenics | 18.57 | 15.28 | 15.60 | 2.14 |
| Mono Aromatics | 20.11 | 17.72 | 17.58 | 8.17 |
| Naphthenic mono Aromatic | 9.31 | 10.40 | 10.15 | 14.79 |
| Di Aromatics | 7.01 | 8.27 | 8.05 | 13.31 |
| Naphthenic Di Aromatics and Tri Aromatics | 4.19 | 9.19 | 8.54 | 29.20 |
| Tri Aromatic and higher | 0.16 | 0.70 | 0.63 | 2.85 |

*the mass balance may not add up to exactly 100.00 wt % due to small measurement and rounding errors.

TABLE 3

Product yield in weight percent of the feed (at 300° C. and 320° C., 60 bar)*

| Product Yield (in wt %) | HTGO only at 300° C. | HTGO + about 20 wt % PDePO at 300° C. | HTGO + about 20 wt % PDePO at 320° C. |
|---|---|---|---|
| 0-82° C. | 0.04 | 1.81 | 1.94 |
| 82-140° C. | 6.29 | 5.41 | 5.54 |
| 140-180° C. | 8.18 | 7.75 | 7.91 |
| 180-250° C. | 24.26 | 20.52 | 20.58 |
| 250-370° C. | 60.58 | 56.50 | 55.64 |
| >370° C. | 0.00 | 3.63 | 3.56 |
| Gas** | 0.20 | 2.86 | 3.57 |
| Water | 0.00 | 2.31 | 3.20 |

*the mass balance may not add up to exactly 100.00 wt % due to hydrogen consumption in the process, measurement and rounding errors.
**Gas is the sum of the gases produced, including CO, $CO_2$, COS and $C_1$—$C_6$ alkanes.

The advantages of the process of the present invention are among others, that the proposed co-processing of a partially deoxygenated pyrolysis oil through a hydrodeoxygenation step, followed by a hydrogenation step on a hydrogenation catalyst enables the conversion of lignocellulosic biomass into useful products using the existing refinery units. Further, the present invention enables the use of decentralised pyrolysis plants which may be located near the source of biomass feedstock, thus reducing the transportation costs by transporting pyrolysis oil instead of the biomass. Further, during the pyrolysis route for conversion of biomass, the minerals from biomass remain largely in the ash, with only a small amount of minerals in the pyrolysis oil, thus reducing the inorganic content that could poison the catalysts such as the HDO catalyst, the hydrotreatment catalyst and the like. Further, since the oxygen wt % in the pyrolysis is in the range of 10 to 30% the amount of hydrogen that is consumed during the HDO and hydrotreatment steps is kept to a minimum. Further, since the HDO step may take place in a close proximity of the refinery, all the existing utilities and distribution channels can be easily leveraged, which makes the economics of the existing process more favourable.

In addition it was found that coke make during the above process was unexpectedly low.

What is claimed is:

1. In a process for treating a pyrolysis oil derived from a material comprising lignocellulose in which
    a) a feed comprising the pyrolysis oil is subjected to a hydrodeoxygenation step in the presence of a catalyst comprising an active component on a catalyst carrier that is inert at the reaction conditions, to obtain a product stream comprising a partially deoxygenated pyrolysis oil;
    b) separating the partially deoxygenated pyrolysis oil from the product stream obtained in a) thereby producing a separated partially deoxygenated pyrolysis oil;
    the improvement comprising the further steps of
    c) providing to a hydrogenation step at least a portion of the separated partially deoxygenated pyrolysis oil having an oxygen content of from 10 to 30 wt %;
    d) hydrogenating, in the hydrogenation step, the separated partially deoxygenated pyrolysis oil from c) in the presence of a catalyst and a hydrocarbon feed derived from a mineral crude oil to obtain a hydrogenated product stream; and
    e) separating at least one product fraction from the hydrogenated product stream obtained in d).

2. The process of claim 1 wherein the partially deoxygenated pyrolysis oil in step c) has an oxygen content (on dry basis) of at least 15 wt % and at most 17 wt %.

3. The process of claim 1 wherein the hydrocarbon feed has an initial boiling point of at least 220° C., as measured according to ASTM D-2887.

4. The process of claim 3 wherein the partially deoxygenated pyrolysis oil in step c) has an oxygen content (on dry basis) of at least 15 wt % and at most 17 wt %.

5. The process of claim 1 wherein the mineral crude oil is gas oil.

6. The process of claim 2 wherein the mineral crude oil is gas oil.

7. The process of claim 3 wherein the mineral crude oil is gas oil.

8. The process of claim 1 wherein the hydrogenation step is performed at a temperature ranging from 300° C. to 450° C.

9. The process of claim 2 wherein the hydrogenation step is performed at a temperature ranging from 300° C. to 450° C.

10. The process of claim 3 wherein the hydrogenation step is performed at a temperature ranging from 300° C. to 450° C.

11. The process of claim 5 wherein the hydrogenation step is performed at a temperature ranging from 300° C. to 450° C.

12. The process of claim 1 wherein the hydrogenation step is performed at a pressure ranging from 50 bars to 100 bars.

13. The process of claim 2 wherein the hydrogenation step is performed at a pressure ranging from 50 bars to 100 bars.

14. The process of claim 3 wherein the hydrogenation step is performed at a pressure ranging from 50 bars to 100 bars.

15. The process of claim 5 wherein the hydrogenation step is performed at a pressure ranging from 50 bars to 100 bars.

16. The process of claim 9 wherein the hydrogenation step is performed at a pressure ranging from 50 bars to 100 bars.

17. The process of claim 1 wherein the hydrogenation step (d) is performed in the presence of nickel, cobalt and/or molybdenum based catalyst.

18. The process of claim 2 wherein the hydrogenation step (d) is performed in the presence of nickel, cobalt and/or molybdenum based catalyst.

19. The process of claim 3 wherein the hydrogenation step (d) is performed in the presence of nickel, cobalt and/or molybdenum based catalyst.

20. The process of claim 16 wherein the hydrogenation step (d) is performed in the presence of nickel, cobalt and/or molybdenum based catalyst.

21. The process of claim 1 further comprising blending a product fraction obtained in step (e) with at least one fuel component other than the product fraction and/or an additive.

22. In a process for producing hydrocarbon products from biomass by pyrolyzing a biomass comprising lignocellulose to obtain a pyrolysis oil, subjecting the pyrolysis oil to a hydrodeoxygenation step in the presence of a catalyst comprising an active component on a catalyst carrier that is inert at the reaction conditions, to obtain a product stream comprising a partially deoxygenated pyrolysis oil;

separating the partially deoxygenated pyrolysis oil from the product stream thereby producing a separated partially deoxygenated pyrolysis oil;

the improvement comprising the further steps of providing to a hydrogenation step at least a portion of the separated partially deoxygenated pyrolysis oil having an oxygen content of from 10 to 30 wt %;

hydrogenating, in the hydrogenation step, said provided-separated partially deoxygenated pyrolysis oil in the presence of a catalyst and a hydrocarbon feed derived from a mineral crude oil to obtain a hydrogenated product stream;

separating at least one product fraction from the hydrogenated product stream; and blending at least one product fraction obtained with at least another fuel compound and/or an additive thereby producing a biofuel.

* * * * *